US011025115B2

(12) United States Patent
Larson et al.

(10) Patent No.: US 11,025,115 B2
(45) Date of Patent: Jun. 1, 2021

(54) ROTOR ASSEMBLY AND METHOD OF COOLING

(71) Applicant: Hamilton Sundstrand Corporation, Charlotte, NC (US)

(72) Inventors: Eric Alan Larson, Rockford, IL (US); Glenn C. Lemmers, Jr., Loves Park, IL (US); Brady A. Manogue, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 41 days.

(21) Appl. No.: 16/361,585

(22) Filed: Mar. 22, 2019

(65) Prior Publication Data

US 2020/0303980 A1    Sep. 24, 2020

(51) Int. Cl.
*H02K 1/32* (2006.01)

(52) U.S. Cl.
CPC ..................................... *H02K 1/32* (2013.01)

(58) Field of Classification Search
CPC .. H02K 9/00; H02K 9/02; H02K 9/08; H02K 1/32
USPC .................................................... 310/61, 214
See application file for complete search history.

(56) References Cited

U.S. PATENT DOCUMENTS

| 4,943,746 | A | 7/1990 | Scherzinger et al. | |
| 5,403,041 | A * | 4/1995 | Merkel | F16L 27/093 285/136.1 |
| 6,734,585 | B2 * | 5/2004 | Tornquist | H02K 1/325 310/52 |
| 6,791,230 | B2 * | 9/2004 | Tornquist | H02K 3/527 310/214 |
| 6,979,929 | B2 * | 12/2005 | Tornquist | H02K 3/527 310/194 |
| 7,146,707 | B2 * | 12/2006 | Tornquist | H02K 1/325 29/598 |
| 7,946,118 | B2 | 5/2011 | Hippen et al. | |
| 8,450,888 | B2 | 5/2013 | Shafer et al. | |
| 8,729,752 | B2 | 5/2014 | Birdi et al. | |
| 9,401,630 | B2 | 7/2016 | Garrard et al. | |

(Continued)

FOREIGN PATENT DOCUMENTS

WO      03/023940 A1    3/2003

OTHER PUBLICATIONS

Extended European Search Report dated Jun. 24, 2020, issued during the prosecution of European Patent Application No. EP 19213116.7.

(Continued)

*Primary Examiner* — John K Kim
(74) *Attorney, Agent, or Firm* — Locke Lord LLP; Joshua L. Jones; Scott D. Wofsy

(57) ABSTRACT

An electric machine rotor assembly includes a rotor core defining a rotor axis. Windings are seated in the rotor core. A plurality of wedges circumferentially spaced apart around the rotor core relative to the rotor axis. Each rotor core extends axially and separates between two respective portions of the windings. A supply end plate is mounted at a first axial end of the rotor core. A return end plate is mounted at a second axial end of the rotor core opposite the first axial end. A flow path for coolant fluid extends through the supply end plate into the wedges, through the wedges and into the return end plate, and through the return end plate.

13 Claims, 6 Drawing Sheets

(56) References Cited

U.S. PATENT DOCUMENTS

| | | |
|---|---|---|
| 2011/0116948 A1 | 5/2011 | Yi et al. |
| 2013/0106211 A1 | 5/2013 | Holzner |
| 2015/0349594 A1* | 12/2015 | Zhang .................... F04D 13/06 |
| | | 417/423.7 |
| 2017/0353092 A1 | 12/2017 | Park et al. |
| 2020/0303980 A1* | 9/2020 | Larson .................... H02K 1/32 |

OTHER PUBLICATIONS

U.S. Appl. No. 16/355,350, filed Mar. 15, 2019. E. A. Larson.

\* cited by examiner

ROTOR ASSEMBLY AND METHOD OF COOLING

BACKGROUND OF THE INVENTION

1. Field of the Invention

The present disclosure relates to electrical machines such as electric motors and generators, and more particularly to cooling for electrical machines.

2. Description of Related Art

Cooling of main generator rotors and stators is required to keep operating temperatures as low as possible. The design challenge is to reduce the friction and windage that occurs from the cooling oil flowing in the air gap between the rotor and stator. Effective designs aim to place the oil as close to the copper windings as possible while preventing the oil from getting into the air gap. The greater extent to which this can be achieved, the greater the efficiency of the generator.

The conventional techniques have been considered satisfactory for their intended purpose. However, there is an ever present need for improved cooling for electrical machines. This disclosure provides a solution for this need.

SUMMARY OF THE INVENTION

An electric machine rotor assembly includes a rotor core defining a rotor axis. Windings are seated in the rotor core. A plurality of wedges are circumferentially spaced apart around the rotor core relative to the rotor axis. Each wedge extends axially and separates between two respective portions of the windings. A supply end plate is mounted at a first axial end of the rotor core. A return end plate is mounted at a second axial end of the rotor core opposite the first axial end. A flow path for coolant fluid extends through the supply end plate into the wedges, through the wedges and into the return end plate, and through the return end plate.

An inner rotor body can be mounted within the rotor core for rotation in common with the rotor core. The flow path can extend from within the inner rotor body, between an axially spaced pair of o-rings sealing between the inner rotor body and the rotor core, and into a set of end plate passages.

The supply end plate can define a plurality of end plate passages therein extending outward from an inward portion of the supply end plate toward an outward portion of the supply end plate. A first axial level of the supply end plate can include straight portions of the end plate passages leading to curved portions of the end plate passages in a second axial level of the supply end plate that is closer to the rotor core than the first axial level. The curved portions can lie in a plane perpendicular to the rotor axis. The curved portions can be relatively perpendicular to the rotor axis on an inner portion of the curved portions, and wherein an outer portion of each curved portion can be relatively tangent to a circumferential direction around the rotor axis. Each of the curved portions can terminate at a banjo bolt turning the respective passage into an axial direction.

Each wedge can include a portion of the flow path therein. Each portion can extend axially through the wedge from a first banjo bolt joining the supply end plate to the wedge to a second banjo bolt joining the return end plate to the wedge. The portion of the flow path in each wedge can include two parallel branches of unequal flow area.

The return end plate can define a plurality of end plate passages therein extending inward from an outward portion of the return end plate toward an inward portion of the return end plate. The end plate passages can curve in a plane perpendicular to the rotor axis. The end plate passages of the return end plate can wind in an opposite clock-wise/counter-clockwise direction from end plate passages of the supply end plate.

The end plate passages can lead inward to a volute in a housing that is stationary relative to the rotor core. The volute can lead to a sump away from rotational hardware of the assembly. The flow path can pass lengthwise in proximity to the windings and can completely bypass an air gap between the rotor core and a stator outward from the rotor core.

A method of cooling a rotor assembly during operation. The method includes porting coolant through an inner rotor body sealingly engaged with a supply plate, porting the coolant radially through passages in the supply plate, porting the coolant axially through wedges in proximity to windings, and porting the coolant radially through a return end plate. The method can include porting the coolant from the return end plate into a volute in a non-rotating housing to direct the coolant to a sump.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
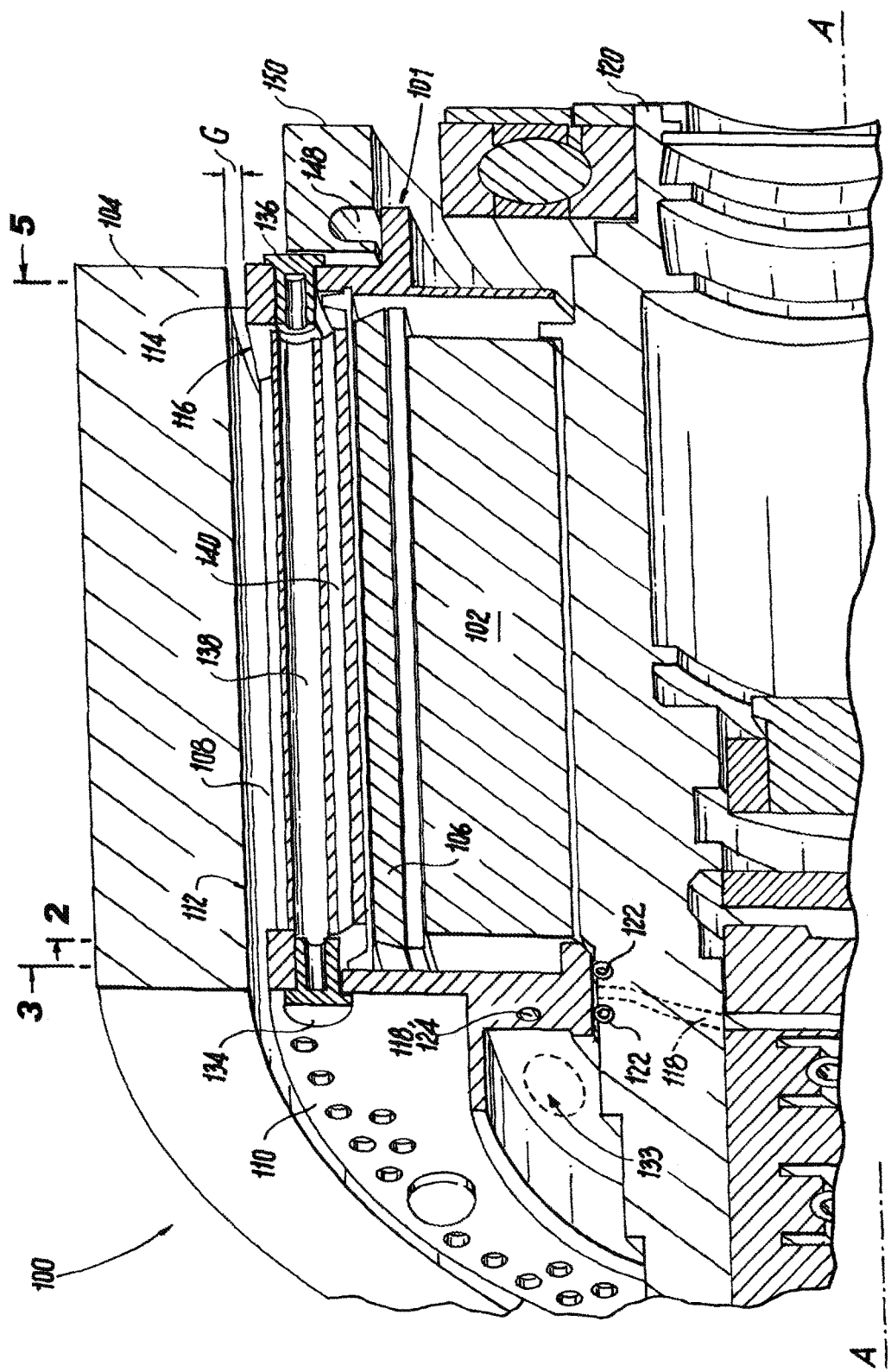
FIG. 1 is a cross-sectional perspective view of an exemplary embodiment of an electric machine rotor assembly constructed in accordance with the present disclosure, showing the supply end plate, the return end plate, one of the wedges, and windings.

Reference will now be made to the drawings wherein like reference numerals identify similar structural features or aspects of the subject disclosure. For purposes of explanation and illustration, and not limitation, a partial view of an exemplary embodiment of an electric machine rotor assembly in accordance with the disclosure is shown in FIG. 1 and is designated generally by reference character 100. Other embodiments of assemblies in accordance with the disclosure, or aspects thereof, are provided in FIGS. 2-7, as will be described. The systems and methods described herein can be used for rotor cooling with superior properties including close proximity of cooling flow to windings with little or no coolant flow into the rotor/stator air gap.

Figure 4:
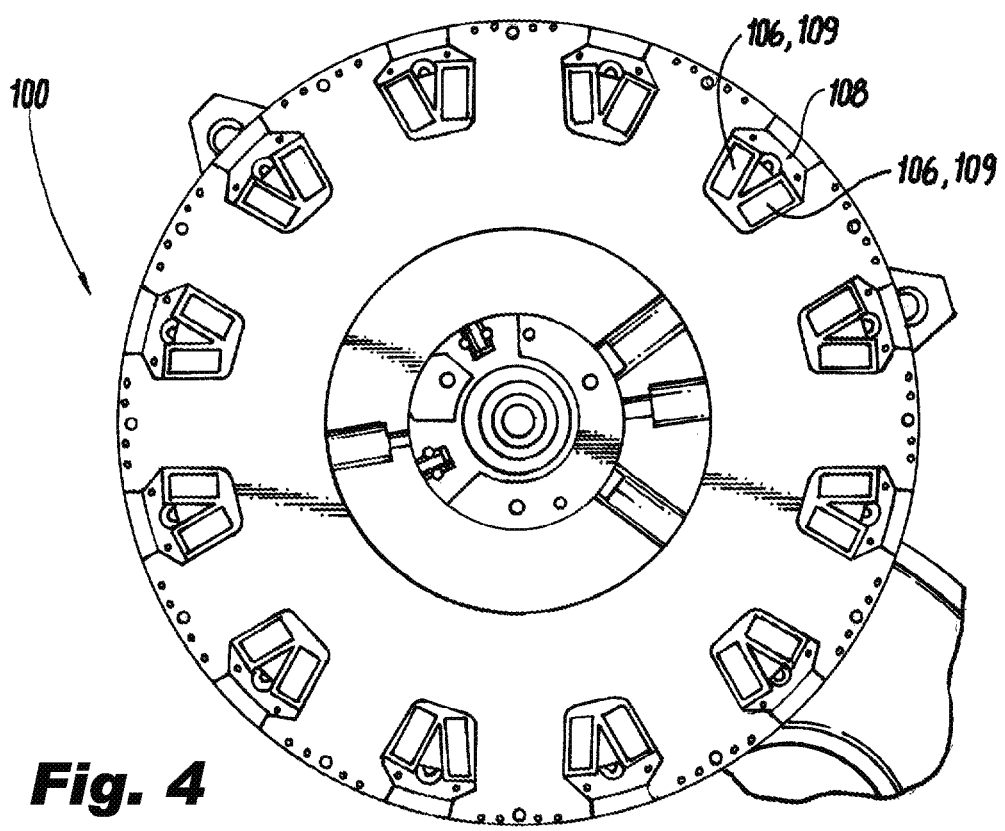
FIG. 4 is a cross-sectional axial view of the rotor of FIG. 1, showing the wedges and windings circumferentially spaced apart around the axis.

The electric machine rotor assembly 100 includes a rotor 101 including a rotor core 102 defining a rotor axis A. A stator 104, which remains stationary as the rotor 101 rotates relative thereto, e.g., driven by a prime mover, is spaced apart from the rotor 101 by a rotor/stator gap G. Windings 106 are seated in the rotor core 102. A plurality of wedges 108 are circumferentially spaced apart around the rotor core 102 relative to the rotor axis A, as shown in FIG. 4. Each wedge 108 extends axially relative to the axis A and separates between two respective portions 109 (two of which are labeled in FIG. 4) of the windings 106. A supply end plate 110 is mounted at a first axial end 112 of the rotor core 102. A return end plate 114 is mounted at a second axial end 116 of the rotor core 102 opposite the first axial end 112. A flow path 118 for coolant fluid, portions of which labeled in FIG. 1 and other portions of which are shown in the remaining figures and discussed below, extends through the supply end plate 110 into the wedges 108, through the wedges 108 and into the return end plate 114, and through the return end plate 114.

An inner rotor body 120 is mounted within the rotor core 102 for rotation in common with the rotor core 102. The flow path 118 extends from within the inner rotor body 120, and continues between an axially spaced pair of o-rings 122 sealing between the inner rotor body 120 and the rotor core 102, and into a set of end plate passages 124, each of which is a part of the flow path 118.

Figure 2:
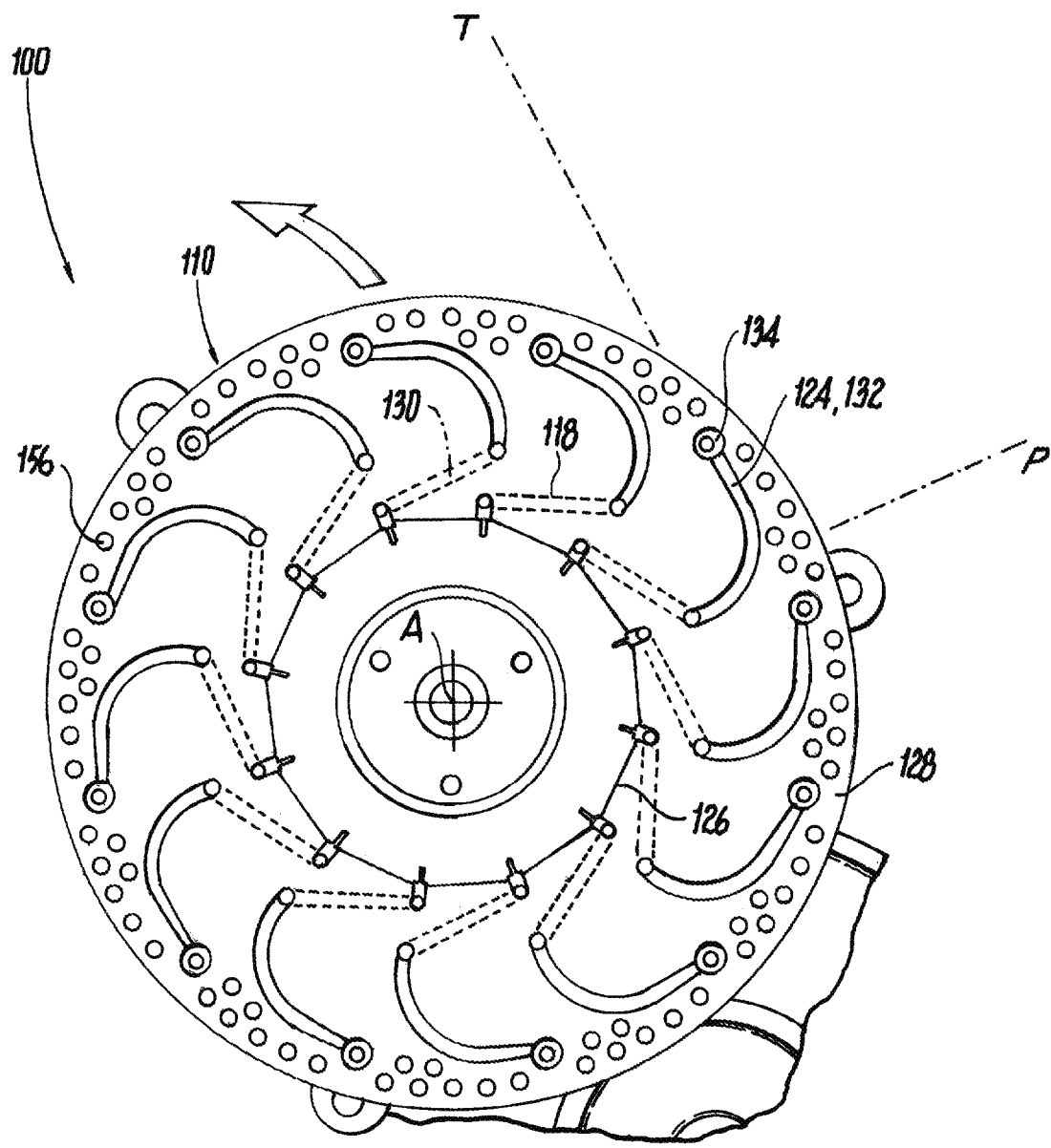
FIG. 2 is a cross-sectional axial view of the supply end plate of FIG. 1, showing the end plate passages for coolant.
Figure 3:
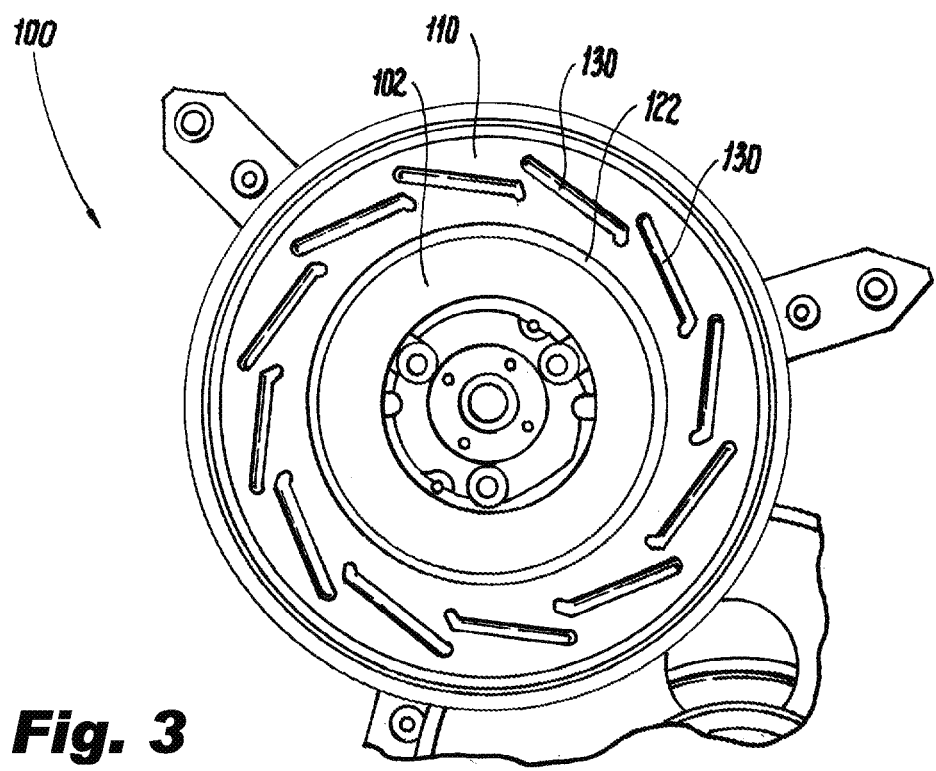
FIG. 3 is a cross-sectional axial view of the supply end plate of FIG. 2, showing another axial level of the end plate passages.

Referring now to FIG. 2, the supply end plate 110 defines a plurality of end plate passages 124 therein extending outward from an inward portion 126 of the supply end plate toward an outward portion 128 of the supply end plate. A first axial level, i.e., the cross-section of the supply end plate 110 shown in FIG. 3, of the supply end plate 110 includes straight portions 130 of the end plate passages 124 leading to curved portions 132 of the end plate passages 124 in a second axial level, i.e. the cross-section of the supply end plate 110 shown in FIG. 2, of the supply end plate 110 that is closer to the rotor core 102 than the first axial level. FIG. 2 shows the straight portions 130 of the end plate passages in broken lines. The straight portions 130 can be used to cool an exciter winding 133 indicated schematically in FIG. 1. The curved portions 132 lie in a plane perpendicular to the rotor axis A. The curved portions 132 are relatively perpendicular to the rotor axis A on an inner portion of the curved portions 132 (as indicated for one of the curved portions 132 by the line P in FIG. 2), and an outer portion of each curved portion 132 is relatively tangent to a circumferential direction around the rotor axis A (as indicated for one of the curved portions 132 by the line T in FIG. 2). Each of the curved portions 132 terminates at a banjo bolt 134 that turns the respective passage 118 into an axial direction to feed into the respective wedges 108.

As shown in FIG. 1, each wedge 108 includes a portion of the flow path 118 therein. Each such portion extends axially through the wedge 108 from a first banjo bolt 134 joining the supply end plate 110 to the wedge 108 and on to a second banjo bolt 136 joining the return end plate 114 to the wedge 108. The portion of the flow path 118 in each wedge 108 includes two parallel branches 138, 140 of unequal flow area, i.e., branch 138 has a larger flow area than branch 140.

Figure 5:
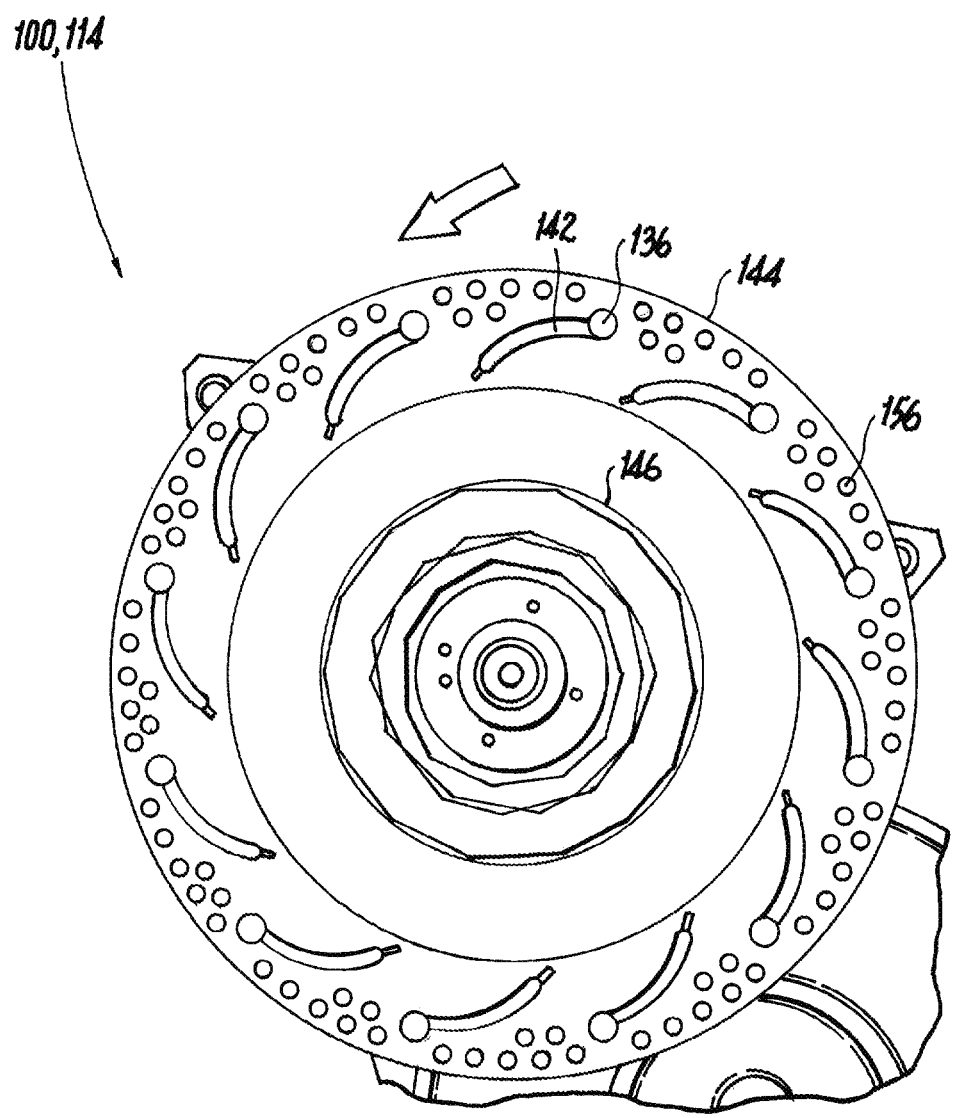
FIG. 5 is a cross-sectional axial view of the return end plate of FIG. 1, showing the end plate passages.

With reference now to FIG. 5, the return end plate 114 defines a plurality of end plate passages 142 therein extending inward from an outward portion 144 of the return end plate 114 toward an inward portion 146 of the return end plate 114. The end plate passages 142 curve in a plane perpendicular to the rotor axis A, i.e. the plane of the cross-section of FIG. 5. Noting the directions of cross-sections indicated in FIG. 1, the end plate passages 142 of the return end plate 114 wind in an opposite clock-wise/counter-clockwise direction from end plate passages 124 of the supply end plate 110, as indicated by the large arrows in FIGS. 2 and 5. These winding directions utilize rotational forces in the rotor 101 for movement of the coolant through the passage 118, and accommodate space for the rotor balancing holes 156 in the supply and return end plates 110, 114 labeled in FIGS. 2 and 5. The passages 124, 124 can be formed by using additive manufacturing to build the supply and return end plates 110, 114.

Figure 6:
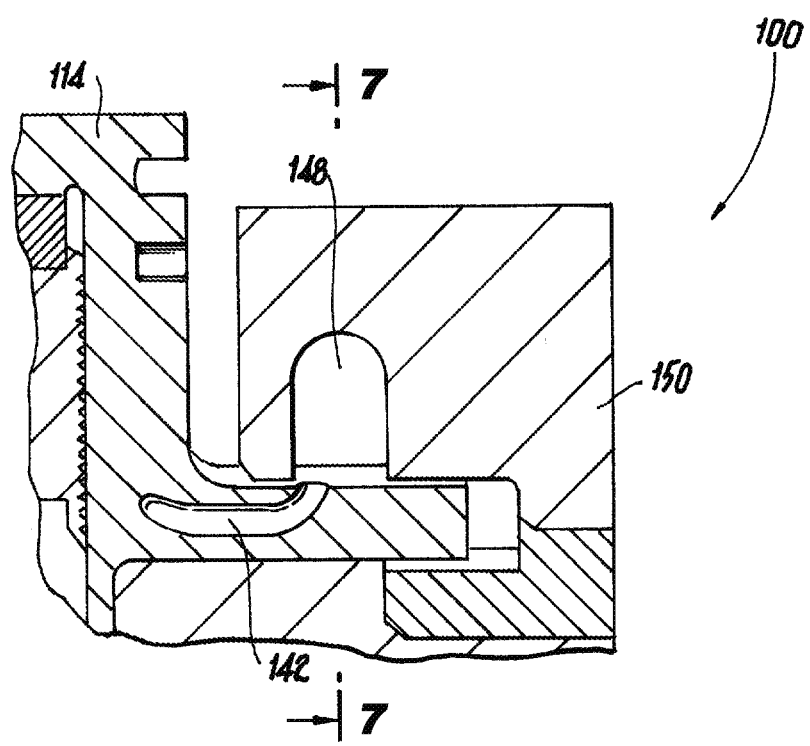
FIG. 6 is a cross-sectional radial view of a portion of the return end plate of FIG. 5, showing the volute in the housing for receiving coolant from the end plate passages.
Figure 7:
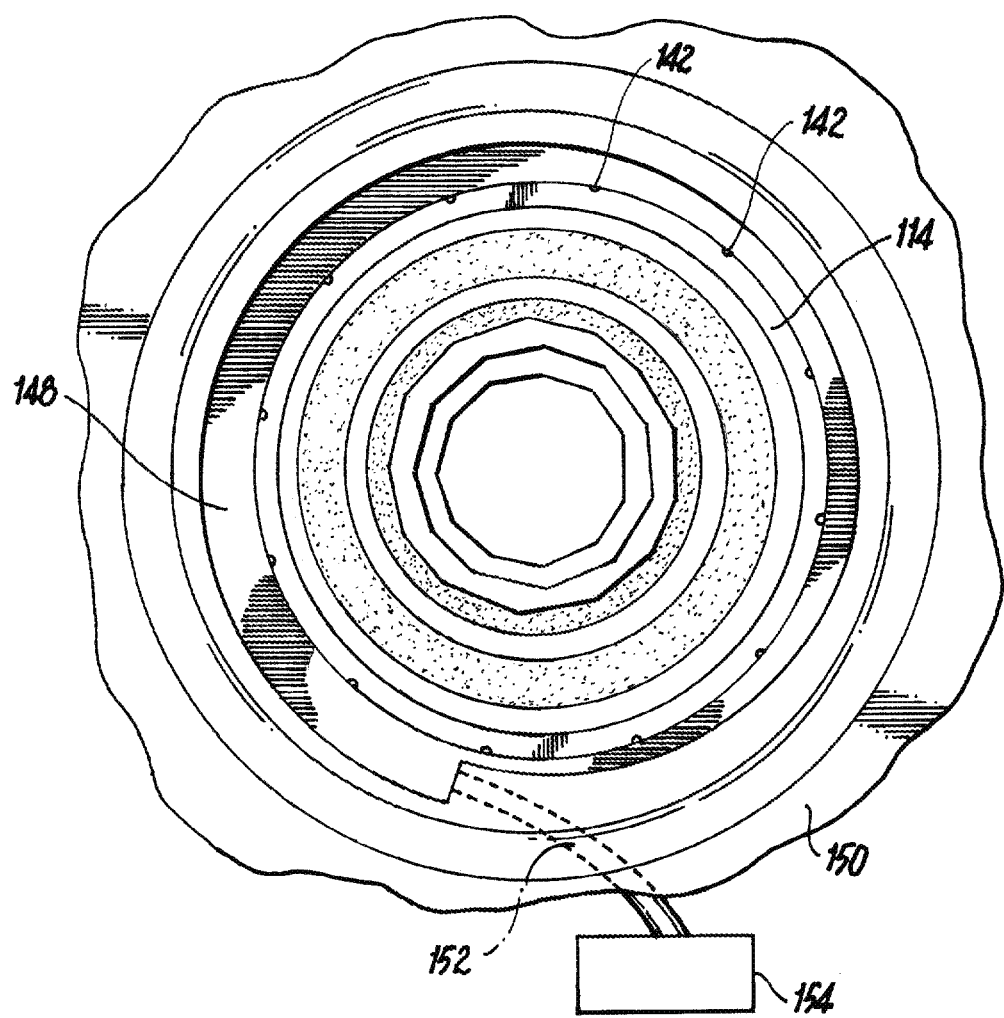
FIG. 7 is a schematic cross-sectional axial end view of the housing of FIG. 6, showing a passage for leading coolant way from the rotating components.

With reference to FIG. 6, the end plate passages 142 lead inward and empty into a volute 148 in a housing 150 that is stationary and non-rotating relative to the rotor core 102. Radial forces on the coolant reduce or prevent any coolant passing between the housing 150 and the return end plate 114. As indicated in FIG. 7, the volute 148 leads away from rotational hardware (including the rotor 101 of the assembly 100) through passage 152 (schematically indicated by broken lines in FIG. 7 at the end of the volute 148 to indicate a passage leading in the radial direction from volute 148) to a sump 154 as indicated schematically by the broken line in FIG. 7. The flow path passes lengthwise through the wedges 108, as shown in FIG. 1, in proximity to the windings 106 but completely bypasses the air gap G between the rotor core 102 and the stator 104 outward from the rotor core 102. The coolant, e.g., cooling oil, is completely contained throughout the flow path 118 from the inner rotor body 120 to the sump 154 so the coolant need not add to friction and windage losses in the gap G of FIG. 1. The coolant flow through the flow path can be driven by centripetal forces, e.g., due to the outlets of the end plate passages 142 shown in FIG. 6 being radially further from the axis A than the inlets to the end plate passages 124 shown in FIGS. 1 and 2. It is also contemplated that a pump in the flow path upstream or downstream of the rotor 101 can provide the driving potential.

The methods and systems of the present disclosure, as described above and shown in the drawings, provide for rotor cooling with superior properties including close proximity of cooling flow to windings with little or no coolant flow into the rotor/stator air gap. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric machine rotor assembly comprising:
   a rotor core defining a rotor axis;
   windings seated in the rotor core;
   a plurality of wedges circumferentially spaced apart around the rotor core relative to the rotor axis, each wedge extending axially and separating between two respective portions of the windings;
   a supply end plate mounted at a first axial end of the rotor core; and a return end plate mounted at a second axial end of the rotor core opposite the first axial end, wherein a flow path for coolant fluid extends through the supply end plate into the wedges, through the wedges and into the return end plate, and through the return end plate, wherein the supply end plate defines a plurality of end plate passages therein extending outward from an inward portion of the supply end plate toward an outward portion of the supply end plate, wherein a first axial level of the supply end plate includes straight portions of the end plate passages leading to curved portions of the end plate passages in a second axial level of the supply end plate that is closer to the rotor core than the first axial level.

2. The assembly as recited in claim 1, further comprising an inner rotor body mounted within the rotor core for rotation in common with the rotor core, wherein the flow path extends from within the inner rotor body, between an axially spaced pair of o-rings sealing between the inner rotor body and the rotor core, and into a set of end plate passages.

3. The assembly as recited in claim 1, wherein the curved portions lie in a plane perpendicular to the rotor axis.

4. The assembly as recited in claim 1, wherein the curved portions are relatively perpendicular to the rotor axis on an inner portion of the curved portions, and wherein an outer portion of each curved portion is relatively tangent to a circumferential direction around the rotor axis.

5. The assembly as recited in claim 4, wherein each of the curved portions terminates at a banjo bolt turning the respective passage into an axial direction.

6. The assembly as recited in claim 1, wherein each wedge includes a portion of the flow path therein, wherein each portion extends axially through the wedge from a first banjo bolt joining the supply end plate to the wedge to a second banjo bolt joining the return end plate to the wedge.

7. The assembly as recited in claim 6, wherein the portion of the flow path in each wedge includes two parallel branches of unequal flow area.

8. The assembly as recited in claim 1, wherein the return end plate defines a plurality of end plate passages therein extending inward from an outward portion of the return end plate toward an inward portion of the return end plate.

9. The assembly as recited in claim 8, wherein the end plate passages curve in a plane perpendicular to the rotor axis.

10. The assembly as recited in claim 9, wherein the end plate passages of the return end plate wind in an opposite clock-wise/counter-clockwise direction from end plate passages of the supply end plate.

11. The assembly as recited in claim 8, wherein the end plate passages lead inward to a volute in a housing that is stationary relative to the rotor core.

12. The assembly as recited in claim 11, wherein the volute leads to a sump away from rotational hardware of the assembly.

13. The assembly as recited in claim 1, wherein the flow path passes lengthwise in proximity to the windings and completely bypasses an air gap between the rotor core and a stator outward from the rotor core.

\* \* \* \* \*